United States Patent Office 3,095,294
Patented June 25, 1963

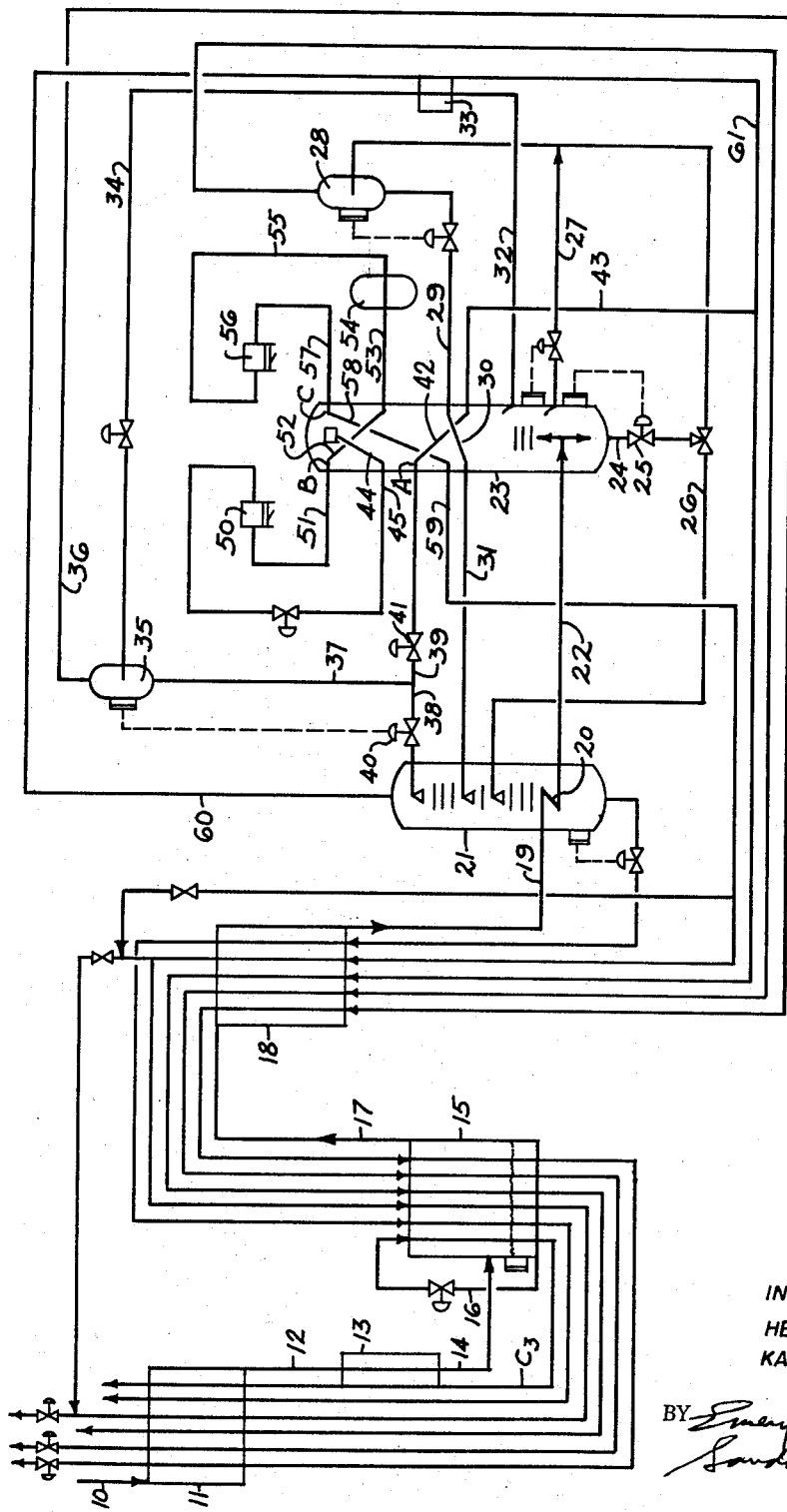

3,095,294
GAS SEPARATION PROCESS AND SYSTEM
Helmut Knapp, Yonkers, N.Y., and Karl Stork, Frankfurt am Main, Germany; said Knapp assignor to American Messer Corporation, New York, N.Y., a corporation of New York
Filed July 8, 1960, Ser. No. 41,700
7 Claims. (Cl. 62—31)

This invention relates to a process for the separation of complex gas mixtures into the separate components and, in particular, it is concerned with the separation of hydrogen and CO from gases containing relatively large proportions of hydrogen in admixture with carbon monoxide, carbon dioxide, and certain low molecular weight hydrocarbon gases.

In petro-chemical operations, mixtures of natural gases are reacted variously or subjected to various forms of catalytic decomposition which result in the production of gases containing large proportions of hydrogen for use in further synthetic operations. The first stage of the petro-chemical operation is of course conversion of the gas to approximately the composition desired. A second stage is utilization of that gas. Complex gas mixtures result from preparation of the natural gas for the petro-chemical operation or from the accumulation of residual gases from the petro-chemical process. The characteristic feature of these gases is their unusual composition, which generally has no relation to any kind of naturally occurring mixture and therefore presents a variety of problems to be solved.

It is, accordingly, a fundamental object of this invention to provide a method of treating a complex gas mixture characterized by its relatively high content of hydrogen and CO in a manner such that a hydrogen fraction of high purity can be obtained; a carbon monoxide fraction also of high purity can be obtained, together with several other pure fractions of low molecular weight hydrocarbons separated from the mixture.

Other objects and advantages of the invention will in part be obvious and in part appear hereinafter.

The invention, accordingly, is embodied in a process involving distilling a complex gas mixture having substantially the following composition:

| | Percent |
|---|---|
| Hydrogen | 30–70 |
| CO | 10–50 |
| $CH_4$ | 0–10 |
| $C_2H_4$ | 0–5 |
| $C_3H_6$ | 0–10 |
| $C_3H_8$ | 0–20 |
| $CO_2$ | Trace | and recovering from the operation a main product consisting of hydrogen of high purity, preferably about 98% or better, and carbon monoxide of about the same degree of purity.

The process comprises taking a gas having a composition corresponding to that described, cooling, and preliminarily, at least partially, liquefying the gas, distilling the gas to obtain hydrogen and carbon monoxide fractions, employing a plural-stage expansion of the gas at one of the distillation zones in the operation, thereby separating the gas into a plurality of streams, consisting of a vent gas containing hydrogen and carbon monoxide, a first product stream consisting of high purity carbon monoxide with some hydrogen, a second product stream consisting of high purity hydrogen with some carbon monoxide, and hydrocarbon fraction streams containing in a first one, about 80% methane and in a second one, 91% propane and propylene with minor amounts in each of these streams of the other low molecular weight hydrocarbon gases entering the system as part of the feed.

Where the feed gas stream contains high concentration of carbon dioxide, and other contaminates ($H_2S$, COS, $CS_2$ etc.) provisions for removing carbon dioxide and contaminants from the stream can be made involving chemical washing.

The process will be better understood by reference to the drawing which consists of a flow diagram showing the succession of stages in the process and the kind of apparatus employed in carrying out the several parts of the operations needed.

Referring now to the drawing the direction of gas flow in the separate streams has been indicated by means of an arrow head and the successive streams have been numbered for purposes of identification and simplication of the matter of tracing through the circuit.

Raw gas enters the system through feed line 10 to enter the shell side of heat exchanger 11, where it is cooled by being passed countercurrently in heat exchange relationship over the coils carrying the several effluent streams from the system. The raw gas is cooled-liquefied, at least partially, and passes out of heat exchanger 11 through line 12 to enter heat exchanger 13, where it passes in countercurrent heat exchange relationship to a propane fraction which is one of the products of the process. The raw gas leaves heat exchanger 13 through line 14, by this time at least in partially liquefied condition, and is introduced into the lower section of the shell side of heat exchanger 15.

In heat exchanger 15, temperature and pressure are such that most of the propane and propylene content of the raw gas is condensed and flows back into the bottom of heat exchanger 15, where a body of such liquefied gas accumulates, as indicated. By this countercurrent flow of condensing liquid and rising vapor a rectification action is achieved resulting in high enrichment of propane and propylene in the liquid. When the raw gas is rising through the heat exchanger 15 and being cooled by the effluent streams passing through the heat exchanger in their several coils, most of the cold is generated by expanding and evaporating the propane-propylene fraction collected in the bottom of the heat exchanger 15 into the cold end of heat exchanger 15 by having it pass through line 16 to enter the cold end. The propane fraction produced in heat exchanger 15 is removed through its indicated product line, $C_3$.

The raw gas stripped of the propane-propylene component leaves heat exchanger 15 by line 17 and enters the shell side of the top of heat exchanger 18 to be cooled further, while passing downward countercurrent to the several effluent product streams in their respective coils. This partially liquefied raw gas leaving the bottom of heat exchanger 18 by line 19 passes through coil 20 in the bottom of column 21. In passing through the coil 20, it is further cooled and liquefied, transferring its heat to the liquid in the bottom of column 21.

The raw gas thus liquefied leaves through line 22 to enter the bottom of column 23 for distillation into pure hydrogen fraction and pure carbon monoxide fraction.

At this point a typical gas, assuming a starting gas having an average composition in the range indicated, would contain about 60 percent hydrogen to about 30 percent carbon monoxide, with about 9 percent methane and small amounts of the other gases.

A liquid fraction, largely methane, accumulates in the bottom of column 23 and a portion thereof is withdrawn through line 24 controlled by valve 25 and through line 26 into the middle of column 21. The vapor fraction in column 23 rises through the trays where residual methane is removed, by fractionation using liquid CO as reflux, collected as it drains down the column and is drawn off through line 27.

This methane-carbon monoxide mixture first obtained in column 23 is passed through line 27 into separator 28 where hydrogen is flashed off and from whence the methane-carbon monoxide passes through line 29 through coil 30 in column 23. Here most of the liquid evaporates in the coil thereby cooling vapors in this upper portion of column 23. The gas then passes through line 31, to enter column 21.

In column 23, after removal of the methane, at the first stage of distillation, the residual hydrogen carbon monoxide vapor is further cooled as it passes upward through the upper portion of column 23, where it is refrigerated by the several streams passing through their respective indicated coils. The condensing carbon monoxide flows downward through column 23 and is collected at the bottom of the upper section. This raw carbon monoxide is withdrawn through line 32 and sub-cooled by passing it counter-current to the carbon monoxide product in sub-cooler 33. It passes from the sub-cooler 33 by way of line 34 and separator 35. Here hydrogen is flashed off and passed by line 36 to be vented. Carbon monoxide is taken from separator 35 by line 37, to lines 38 and 39, controlled by valves 40 and 41. Part of this carbon monoxide fraction is taken as reflux through valve 40 and into tower 21. The rest of the carbon monoxide is taken through valve 41 and coil 42 in tower 23, where it serves to cool the hydrogen carbon monoxide mixture, and thence, via line 43 to the CO product line.

The hydrogen fraction is withdrawn from the top of column 23 through open end of coil 44, warmed, and introduced via line 45 into the first stage of the expansion 50. Following expansion to an intermediate pressure, it is introduced through line 51 through to coil 52 in the tower, where it serves to cool the vapors in the top of the tower, thence, through line 53, to surge tank 54, and then via line 55 into a second stage expansion engine 56. Following the repeated expansion to the final pressure the hydrogen is passed through line 57 to coil 58 in the upper part of column 23 to supply some additional refrigeration and thence via line 59 to product collection.

In column 21, carbon monoxide, contained in two streams is recovered; the first condensed and collected in the bottom of column 23, and fed to column 21 via line 26; the second is collected at the bottom of rectification section of column 23, fed via line 27, through separator 28, line 29—31 to column 21 and the CO is recovered as overhead vapor passing out through line 60, through sub-cooler 33 and line 61, and then through the succession of heat exchangers 18, 15 and 11 as one of the several product streams. It appears as a product stream of carbon monoxide about 98% pure and containing the rest hydrogen.

The methane fraction, together with some carbon monoxide, propane, and propylene is collected in the bottom of column 21, withdrawn as liquid, and introduced into heat exchanger 18 and thereafter successively, 15 and 11 to appear as a product stream.

In this fashion, all of the several product streams are collected and passed through the heat exchangers as product streams of well-defined composition, related to the initial composition of the gas. The main products, of course, are hydrogen of 98% purity and carbon monoxide of 98% purity, obtained at the several points in the process indicated.

Considerable operating advantages and flexibility of operation are obtained through the utilization of the several separate heat exchanges, the two columns and, particularly, the two stage expansion engine associated with column 23.

In any gas liquefaction and distillation process, operating at low temperature, refrigeration is achieved and maintained through successive compressions and expansions of gas. The possibility of generating refrigeration by expansion of gas, while doing work contained in the compressed raw gas, is most efficiently done by expanding the gas in several stages at the lowest levels of temperature where the refrigeration is most essential for the purification of the hydrogen product. That is, it permits, in this instance, the separation in the single tower, by distillation of the raw gas, of substantially pure fractions of, first the hydrocarbon components as a bottom product, second a raw carbon monoxide-methane fraction containing about ⅔ carbon monoxide as a product at an intermediate point, and, third, beyond that at a higher point in the tower to condense and recover a substantially pure carbon monoxide fraction and, fourth, at top pure hydrogen.

The distillation tower is thus filled with the vapors of the gas under high pressure, and the several fractions are condensed from the gas as the several components identified, at the points indicated, through the passage of gas through the several coils in the vapor space in the tower. In the drawing, the gradient of the several coils downward in the tower is indicative of the direction of temperature change ascribed to it. Thus, as the gas passes down in the coil in the tower, it is heated (is made less cold) by refrigerating the vapors in the corresponding portion of the tower. For example, the lowest temperature attainable at point A in the tower 23 is that given by the evaporation of liquefied gases in line 39 as they enter coil 42; at this level in the tower, the gas being distilled might be 90% hydrogen and 10% carbon monoxide. To fractionate it further, additional refrigeration is developed by means of the double expansion of gas: the cold, pure hydrogen from coil 44 is expanded and enters coil 52 at point B; similarly, the pure product hydrogen is further expanded in engine 56 to enter coil 58 at point C. These two refrigeration steps condense most of the carbon monoxide in the gas. This arrangement, using the combination of the expansion engines, permits taking essentially pure hydrogen vapor out from the top of the tower expanding it once to cool it, passing it back through the tower in a coil to cool it further, then expanding it a second time in another expansion engine and passing it through the tower a second time thereby to liquefy it and have it appear as a product stream of 98% hydrogen purity.

Typical compositions derivable from a gas having the following compositon are indicated as follows.

Feed gas: | Percent
--- | ---
$H_2$ | 50
CO | 25
$CH_4$ | 10
$C_3H_6$ | 1
$C_3H_8$, $CO_2$, etc. | 14

Product:
Tower 21—
  Top 21 _____ 98% CO.
  Bottom 21 _____ {80% $CH_4$.
                        {20% $C_3$ etc.
Tower 23—
  Top 23 _____ 98% $H_2$.
  Int. 23 _____ {94% CO.
                        { 6% $H_2$.
  Tower 23 _____ {60% CO  }
                        {35% $CH_4$ } crude
                        { 5% $H_2$ }  CO.
  Bottom 23 _____ {35% CO } crude HC
                        {45% $CH_4$} fraction.

The principal product fraction consisting of hydrogen virtually in pure form as essentially the non-condensable gas withdrawn from the top of tower 23 consist about 98% hydrogen with 2% carbon monoxide and, correspondingly, the principal carbon monoxide stream containing virtually 98% carbon monoxide is obtained through lines 43 and 61 and directed back through to a product line.

The two principal fractions of gas obtained in the process, therefore, are hydrogen of essentially 98% purity together with carbon monoxide of about the same degree of purity. The remaining fractions are salvaged for whatever value they might have.

What is claimed is:

1. The method of separating a complex gas mixture into separate substantially pure components wherein the said gas mixture contains about 50 percent hydrogen, 25 percent carbon monoxide, up to 10 percent methane, up to 20% propane, propylene and residue small amounts of carbon dioxide, the process serving to separate the gas into four principal product components consisting individually of a first product of about 98 percent hydrogen and not more than about 2 percent carbon monoxide; a second product consisting of about 98 percent carbon monoxide and about 2 percent hydrogen and the remaining products being a methane fraction and a heavier hydrocarbon fraction, the process consisting of first compressing and cooling said raw gas in a sequence of heat exchangers by passing it through said heat exchangers in heat exchange relationship with the separate product streams, and passing the partially liquefied gas through a coil in a first distilling tower in heat exchange relationship with gas to be distilled therein, thereafter passing said partially liquefied gas into the base of a fractionating column maintained under a high pressure and a temperature gradient from top to bottom, the said gas entering said distilling tower at the base, removing from the base of said tower methane as will condense and collect in the base of the tower, removing from an intermediate level above the base of said tower a major portion of methane, removing from approximately a mid level of said tower a substantially pure carbon monoxide fraction and removing from the top of said tower a substantially pure hydrogen fraction, while maintaining in the fractionation zone between the mid level and top of said tower refrigeration conditions, first by passing a part of said methane product through a cooling coil in said tower, expanding it, and passing it to said first tower for final fractionation, second, by passing said carbon monoxide product fraction, in part at least, through a coil in said distillation zone, expanding it, and returning it to product, while passing the remainder ot said first tower as reflux and, third, passing hydrogen product through coils in said distillation zones in a plurality of successive stages following intermediate expansions and then recovering said hydrogen as product.

2. The method in accordance with claim 1 in which the hydrogen product gas is twice expanded and after each expansion is passed through the distillation zone of said tower in heat exchange relationship with gas being distilled therein.

3. The method in accordance with claim 2 in which all product streams are passed in counter-current heat exchange relationship with raw feed gas entering the system.

4. The method in accordance with claim 2 in which carbon monoxide product fraction is recovered from said distillation zone, passed to a separator, hydrogen removed, and recovered, and carbon monoxide thereafter fed partially to product and partially to reflux in said first distillation zone.

5. Apparatus providing a system for the separation of complex gas mixtures into a plurality of relatively pure product components, which comprises, heat exchange means for passing a raw feed gas in counter-current heat exchange relationship with a plurality of product gas streams from said system, a first distillation means, said first distillation means being heated by compressed partially liquefied raw feed gas, a second distillation means, a feed line passing said raw gas to said second distillation means, separate product lines removing from said second distillation means a bottom product, a first intermediate product, a second intermediate product and a top product, means separately conducting said first and said second intermediate products through said second distillation means in heat exchange relationship with gas therein, a means for receiving top product and expanding it a plurality of times and after each expansion conducting it through said second distillation means in heat exchange relationship with gas therein, and means for separately collecting each of said products.

6. The system in accordance with claim 5 in which the bottom product and first and second intermediate products from said second distillation means are separately fed to said first distillation means to accomplish a complete separation thereof.

7. In a system in accordance with claim 5, a second distillation means comprising a shell suitable to be maintained under a high pressure and temperature gradient from top to bottom said shell including four distillation zones, a bottom zone, a first adjacent zone, a second adjacent zone, and a top zone, said bottom zone receiving raw feed gas in liquid condition to accomplish a separation of high boiling components from low boiling components, said first adjacent zone consisting of a plurality of trays for completing separation of residual amounts of bottom zone products, said second adjacent zone being refrigerated by a plurality of cooling means, the first cooling means being said first adjacent zone product passed therethrough in heat exchange relationship, the second cooling means being raw CO passed therethrough in heat exchange relationship, said two cooling means accomplishing separation of high boiling components, and said top zone being refrigerated by a further plurality of cooling means, including a first cooling means whereby a top fraction is passed through heat exchange conduit to a first stage expansion engine, expanded and cooled, and returned to said zone in heat exchange relationship therewith, a second conduit heat exchange cooling means wherein the expanded fraction is passed to a second stage expansion engine, expanded and cooled, and returned to said zone in heat exchange relationship therewith, through a third conduit heat exchange means whereupon the gas is passed to product collection.

References Cited in the file of this patent

UNITED STATES PATENTS

| 2,035,516 | Wilkinson et al. | Mar. 31, 1936 |
| 2,534,903 | Etienne | Dec. 19, 1950 |
| 2,688,238 | Schilling | Sept. 7, 1954 |